(12) United States Patent
Sawdey

(10) Patent No.: US 7,136,967 B2
(45) Date of Patent: Nov. 14, 2006

(54) MULTI-LEVEL CACHE HAVING OVERLAPPING CONGRUENCE GROUPS OF ASSOCIATIVITY SETS IN DIFFERENT CACHE LEVELS

(75) Inventor: Aaron Christoph Sawdey, Cannon Falls, MN (US)

(73) Assignee: International Business Machinces Corporation, Armonk, NY (US)

( * ) Notice: Subject to any disclaimer, the term of this patent is extended or adjusted under 35 U.S.C. 154(b) by 400 days.

(21) Appl. No.: 10/731,065

(22) Filed: Dec. 9, 2003

(65) Prior Publication Data

US 2005/0125592 A1  Jun. 9, 2005

(51) Int. Cl.
*G06F 12/00* (2006.01)
(52) U.S. Cl. .................. 711/128; 711/119
(58) Field of Classification Search ............ 711/119, 711/122
See application file for complete search history.

(56) References Cited

U.S. PATENT DOCUMENTS

| | | | | |
|---|---|---|---|---|
| 5,133,061 A | * | 7/1992 | Melton et al. | 711/128 |
| 5,623,627 A | * | 4/1997 | Witt | 711/122 |
| 2004/0225859 A1 | * | 11/2004 | Lane | 711/202 |

* cited by examiner

*Primary Examiner*—Matthew Kim
*Assistant Examiner*—Shane M. Thomas
(74) *Attorney, Agent, or Firm*—Roy W. Truelson

(57) ABSTRACT

A computer cache memory having at least two levels includes associativity sets allocated to congruence groups, each congruence group having multiple associativity sets (preferably two) in the higher level cache and multiple associativity sets (preferably three) in the lower level cache. The address range of an associativity set in the higher level cache is distributed among all the associativity sets in the lower level cache within the same congruence group, so that these lower level associativity sets are effectively shared by all associativity sets in the same congruence group in the higher level. The lower level cache is preferably a victim cache of the higher level cache. This sharing of lower level associativity sets by different associativity sets in the higher level effectively increases the associativity of the lower level to hold cast-outs of a hot associativity set in the upper level.

36 Claims, 6 Drawing Sheets

MULTI-LEVEL CACHE HAVING OVERLAPPING CONGRUENCE GROUPS OF ASSOCIATIVITY SETS IN DIFFERENT CACHE LEVELS

FIELD OF THE INVENTION

The present invention relates to digital data processing hardware, and in particular to the design and operation of cached memory and supporting hardware for processing units of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip, and increased clock speed through further size reduction and other improvements continues to be a goal. In addition to increasing clock speeds, it is possible to increase the throughput of an individual CPU by increasing the average number of operations executed per clock cycle.

A typical computer system can store a vast amount of data, and the processor may be called upon to use any part of this data. The devices typically used for storing mass data (e.g., rotating magnetic hard disk drive storage units) require relatively long latency time to access data stored thereon. If a processor were to access data directly from such a mass storage device every time it performed an operation, it would spend nearly all of its time waiting for the storage device to return the data, and its throughput would be very low indeed. As a result, computer systems store data in a hierarchy of memory or storage devices, each succeeding level having faster access, but storing less data. At the lowest level is the mass storage unit or units, which store all the data on relatively slow devices. Moving up the hierarchy is a main memory, which is generally semiconductor memory. Main memory has a much smaller data capacity than the storage units, but a much faster access. Higher still are caches, which may be at a single level, or multiple levels (level 1 being the highest), of the hierarchy. Caches are also semiconductor memory, but are faster than main memory, and again have a smaller data capacity. One may even consider externally stored data, such as data accessible by a network connection, to be even a further level of the hierarchy below the computer system's own mass storage units, since the volume of data potentially available from network connections (e.g., the Internet) is even larger still, but access time is slower.

When the processor generates a memory reference address, it looks for the required data first in cache (which may require searches at multiple cache levels). If the data is not there (referred to as a "cache miss"), the processor obtains the data from memory, or if necessary, from storage. Memory access requires a relatively large number of processor cycles, during which the processor is generally idle. Ideally, the cache level closest to the processor stores the data which is currently needed by the processor, so that when the processor generates a memory reference, it does not have to wait for a relatively long latency data access to complete. However, since the capacity of any of the cache levels is only a small fraction of the capacity of main memory, which is itself only a small fraction of the capacity of the mass storage unit(s), it is not possible to simply load all the data into the cache. Some technique must exist for selecting data to be stored in cache, so that when the processor needs a particular data item, it will probably be there.

A cache is typically divided into units of data called lines, a line being the smallest unit of data that can be independently loaded into the cache or removed from the cache. In order to support any of various selective caching techniques, caches are typically addressed using associative sets of cache lines. An associative set is a set of cache lines, all of which share a common cache index number. The cache index number is typically derived from high-order bits of a referenced address, although it may include other bits as well. The cache being much smaller than main memory, an associative set holds only a small portion of the main memory addresses which correspond to the cache index number. Since each associative set typically contains multiple cache lines, the contents of the associative set can be selectively chosen from main memory according to any of various techniques.

Typically, data is loaded into a high level cache upon the occurrence of a cache miss. Conventional techniques for selecting data to be stored in the cache also include various pre-fetching techniques, which attempt to predict that data in a particular cache line will be needed in advance of an actual memory reference to that cache line, and accordingly load the data to the cache in anticipation of a future need. Since the cache has limited capacity, loading data upon a cache miss or by pre-fetching necessarily implies that some data currently in the cache will be removed, or cast out, of the cache. Again, various conventional techniques exist for determining which data will be cast out in such an event.

Although conventional techniques for selecting the cache contents have achieved limited success, it has been observed that in many environments, the processor spends the bulk of its time idling on cache misses. The typical approaches to this problem have been to increase the size and/or associativity of the cache, both of which involve significant additional hardware. There exists a need for improved techniques for the design and operation of caches.

SUMMARY OF THE INVENTION

A computer system includes a main memory, at least one processor, and a cache memory having at least two levels. A higher level cache includes a plurality of associativity sets, each associativity set being contained in a respective congruence group, each congruence group having multiple associativity sets of the higher level cache. A lower level cache similarly includes a plurality of associativity sets, each associativity set being contained in a respective congruence group, each congruence group having multiple associativity sets of the lower level cache. The cache line addresses of an associativity set in the higher level cache are distributed among the multiple associativity sets in the lower level cache within the same congruence group.

In one aspect of the preferred embodiment, the lower level cache is a victim cache of the higher level cache, i.e, data is loaded to the lower level cache upon being cast out of the higher level cache. Preferably, data is not duplicated in the higher and lower level caches. A cache line is loaded to the higher level cache upon a cache miss, either from the lower level cache, or from some other source, by-passing the lower level cache. When a cache line is selected for cast out from the higher level cache, it is automatically loaded to the lower level cache, causing a line in the lower level cache to be selected for cast out.

In the preferred embodiment, a congruence group contains a pair of associativity sets in the higher level cache and three associativity sets in the lower level cache, which share certain index address bits. An address hashing function, such as modulo 3, converts some unshared address bits in the associativity set at the higher level to an index selecting the associativity set at the lower level.

Although the terms "higher level cache" and "lower level cache" are used herein, these are intended only to designate a relative cache level relationship, and are not intended to imply that the system contains only two levels of cache. As used herein, "higher level" refers to a level that is relatively closer to the processor core. In the preferred embodiment, there is at least one level of cache above the "higher level cache", which operates on any of various conventional principles.

Although it is generally assumed that address hashing techniques used to index associativity sets in a cache produce a random distribution of memory references to associativity sets, applicant has determined that this is often not the case for second, third or lower level caches in which data has a relatively long cache life. Often, certain associativity sets become significantly "hotter" than others. By effectively sharing the associativity sets at the next lowest cache level among multiple associativity sets at the higher level, in accordance with the preferred embodiment of the present invention, it is possible to increase the available associativity of the lower level cache for cast-outs from a "hot" associativity set in the higher level cache. As a result, the odds that a cache miss in the upper level cache can be satisfied from the lower level cache are increased, with a consequent reduction in average time that a processor is idle waiting on a cache miss.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
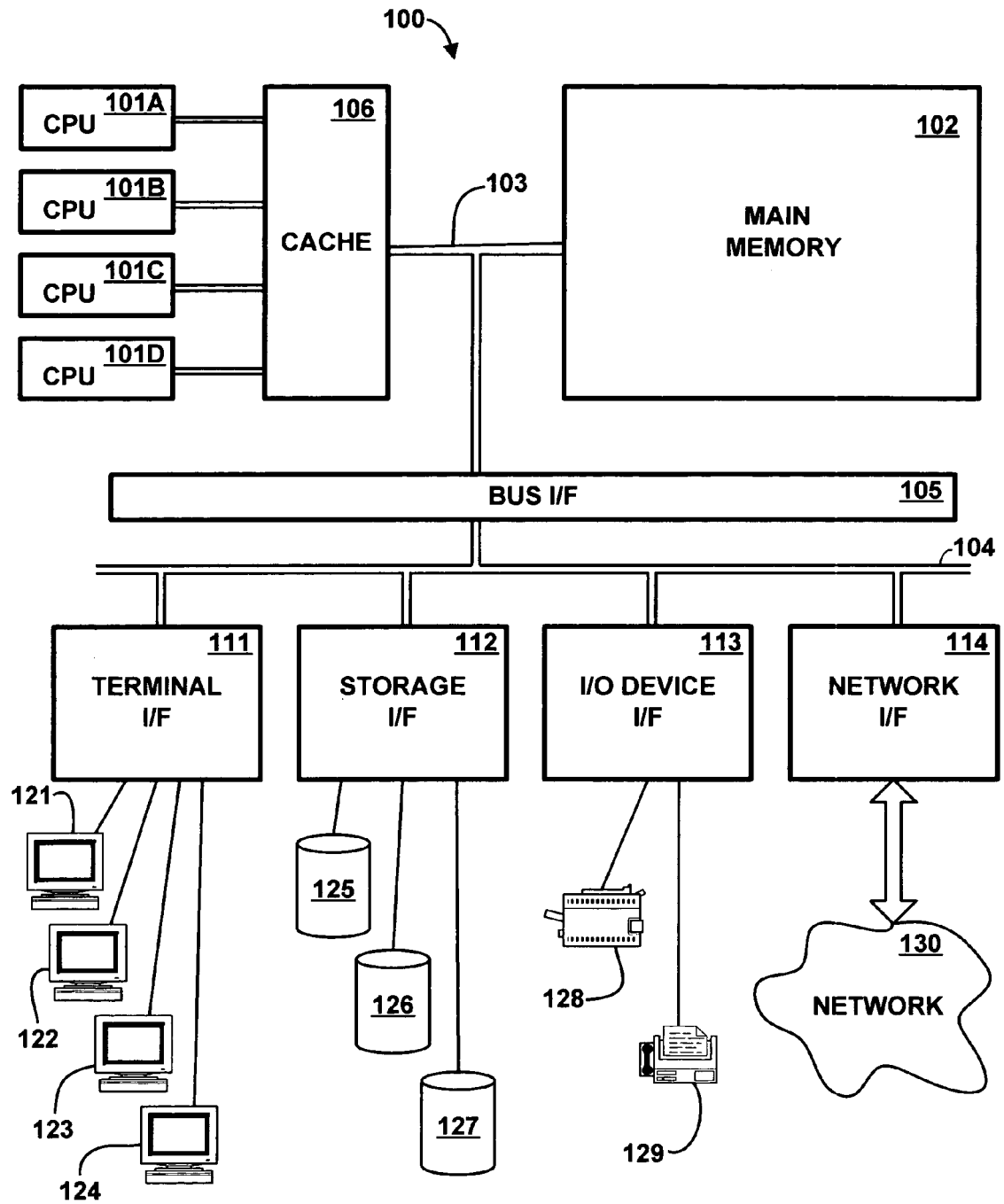
FIG. 1 is a high-level block diagram of the major hardware components of a computer system utilizing congruence groups of overlapping associativity sets in different cache levels, according to the preferred embodiment of the present invention.

Referring to the Drawing, wherein like numbers denote like parts throughout the several views, FIG. 1 is a high-level representation of the major hardware components of a computer system 100 utilizing congruence groups of overlapping associativity sets in different cache levels, according to the preferred embodiment of the present invention. The major components of computer system 100 include one or more central processing units (CPU) 101A–101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A–101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and data are loaded into cache memory 106 from main memory 102 for processing. Main memory 102 is a random-access semiconductor memory for storing data and programs. Although main memory 102 and cache 106 are represented conceptually in FIG. 1 as single entities, it will be understood that in fact these are more complex, and in particular, that cache exists at multiple different levels, as described in greater detail herein.

Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111–114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–124. Storage interface unit 112 supports the attachment of one or more direct access storage devices (DASD) 125–127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
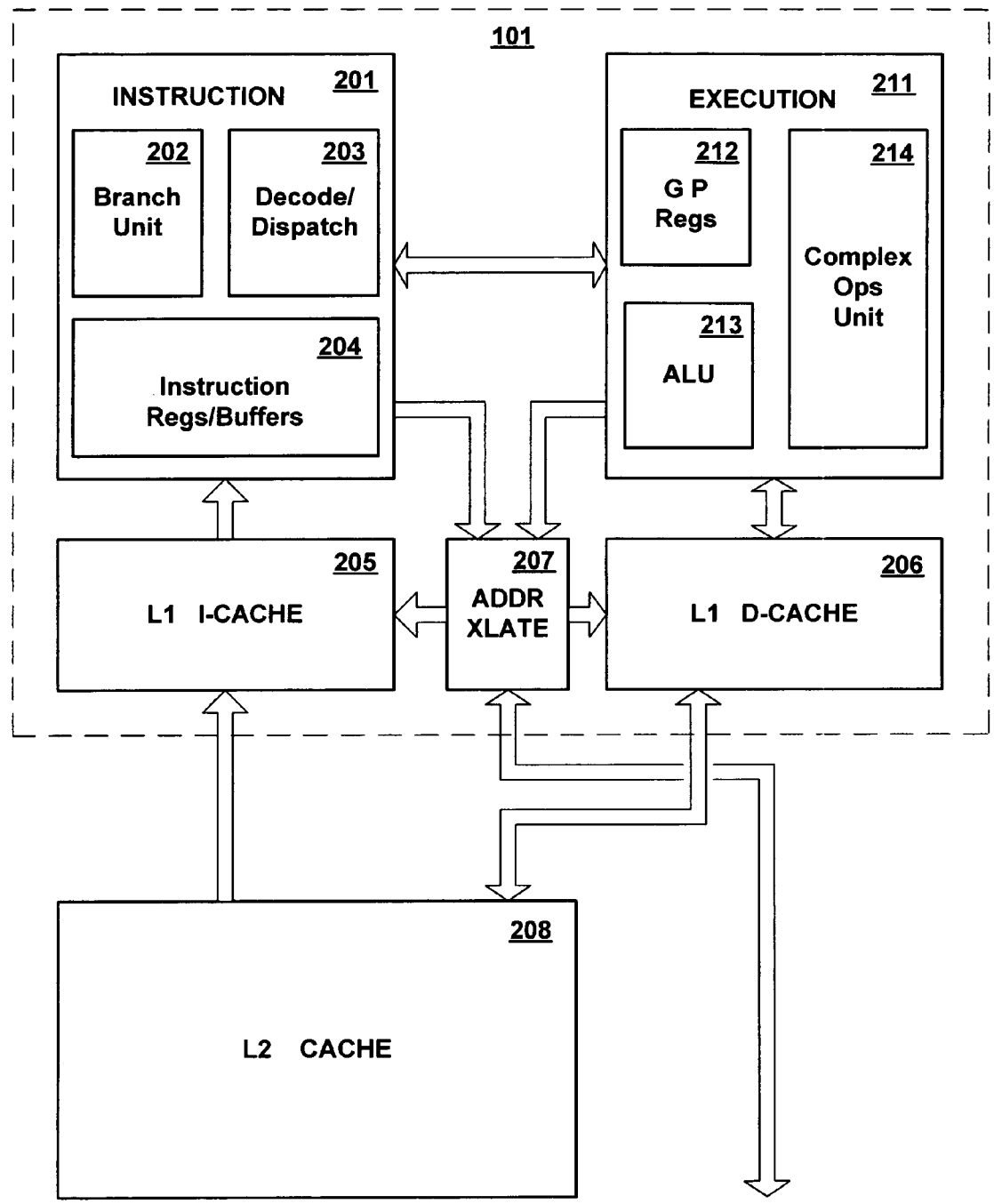
FIG. 2 is a high-level diagram of the major components of a CPU core in the computer system of the preferred embodiment.

FIG. 2 is a high-level diagram of the major components of CPU 101 including certain associated cache structures, according to the preferred embodiment, showing CPU 101 in greater detail than is depicted in FIG. 1. In this embodiment, two CPUs 101, along with certain cache structures, are packaged in a single semiconductor chip, and for this reason CPU 101 is sometimes referred to as a "processor core" or "CPU core", to distinguish it from the chip containing a pair of CPUs. CPU 101 includes instruction unit portion 201, execution unit portion 211, Level 1 Instruction Cache (L1 I-Cache) 205, Level 1 Data Cache (L1 D-Cache) 206, and address translation hardware 207. Level 2 Cache (L2 Cache) 208, shown in FIG. 2, is actually shared by both CPU cores within a single chip, and therefore not considered a part of CPU 101. In general, instruction unit 201 obtains instructions from L1 I-cache 205, decodes instructions to determine operations to perform, and resolves branch conditions to control program flow. Execution unit 211 performs arithmetic and logical operations on data in registers, and loads or stores data from L1 D-Cache. L2 Cache 208 is a level 2 cache, generally larger that L1 I-Cache or L1 D-Cache, providing data to L1 I-Cache 205 and L1 D-Cache 206. L2 Cache 208 obtains data from a lower level cache or main memory, through an external interface.

Instruction unit 201 comprises branch unit 202, instruction decode/dispatch unit 203, and instruction registers and buffers 204. Instructions from L1 I-cache 205 are loaded into buffers 204 prior to execution. Depending on the CPU design, there may be multiple buffers (e.g., one for a sequential series of instructions, and others for branch-to locations), each of which may contain multiple instructions. Decode/dispatch unit 203 receives the current instruction to be executed from one of the buffers, and decodes the instruction to determine the operation(s) to be performed or branch conditions. Branch unit 202 controls the program flow by evaluating branch conditions, and refills buffers from L1 I-cache 205.

Execution unit 211 comprises a set of general purpose registers 212 for storing data and an integer arithmetic logic unit (ALU) 213 for performing arithmetic and logical operations on data in GP registers 212 responsive to instructions decoded by instruction unit 201. Execution unit further includes complex operations subunit 214 for performing mathematically intensive operations, such as floating point operations. Subunit 214 may include its own special registers (not shown). Integer ALU 213 and complex operations subunit 214 are typically implemented as multi-stage pipelines. In addition to components shown in FIG. 2, execution unit may include additional special purpose registers and counters, load and store hardware for fetching data from or storing it to cache or memory, control hardware, and so forth. In particular, execution unit 211 may include pipelines (not shown) in addition to integer ALU and complex operations subunit 214. Additional pipelines, such as an instruction fetch and decode pipeline, may exist within processor 101.

Address translation hardware 207 translates effective addresses generated by instruction unit 201 or execution unit 211 to corresponding real addresses in memory. In the preferred embodiment, the processor generates "effective addresses" in an effective address space corresponding to each respective executing process. Effective addresses are translated to "virtual addresses" in a larger universal virtual address space, there being one virtual address space shared by all processes. The virtual addresses are further translated to "real addresses", corresponding to the actual memory locations at which the data is located. However, it will be understood that various computer architectures employ different addressing constructs, and the present invention is not limited to any particular form of addressing.

Caches are preferably addressed using real addresses, and therefore an effective address generated by the processor is first translated to a real address by address translation hardware 207, in order to access data in a cache. Address translation hardware 207 is shown as a single conceptual entity in FIG. 2, and may include any of various translation mechanisms as are known in the art, such as a translation look-aside buffer, a segment look-aside buffer, an effective-to-real address translation table, or other mechanisms, along with hardware associated with accessing and translating data in any of these structures. Alternatively, as is known in some computer system designs, it would be possible to access some or all cache levels using effective addresses generated by the processor. L1 I-cache 205 and L1 D-cache 206 are separate instruction and data caches providing data to instruction and execution units. L2 cache is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 208, which in turn obtains it from an external location, and then transferred from L1 cache to the corresponding unit. Depending on the processor design, it may be possible to by-pass L1 cache and load data from L2 cache 208 to an execution or instruction register.

In the preferred embodiment, CPU 101 supports the concurrent execution of multiple (preferably two) threads. A separate set of GP registers 212 (not shown), as well as certain other structures, exists for each thread. However, the number of threads supported may vary, and the present invention could be used in processors supporting only a single thread of execution.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU 101 may have a simple or complex instruction set, which supports the dispatching of a single operation, or multiple operations, with each processor cycle.

L1 caches 205 and 206 are shown in FIG. 2 as part of CPU 101 because each CPU has its own respective L1 caches. Architecturally, caches may be considered part of memory 102, or may be considered part of the CPU, or may be considered separate entities entirely. The representation of FIG. 2 is intended to be typical, and is not intended to limit the present invention to any particular physical cache implementation. The processor chip or chips may include more caches or fewer caches than represented in FIG. 2.

Figure 3:
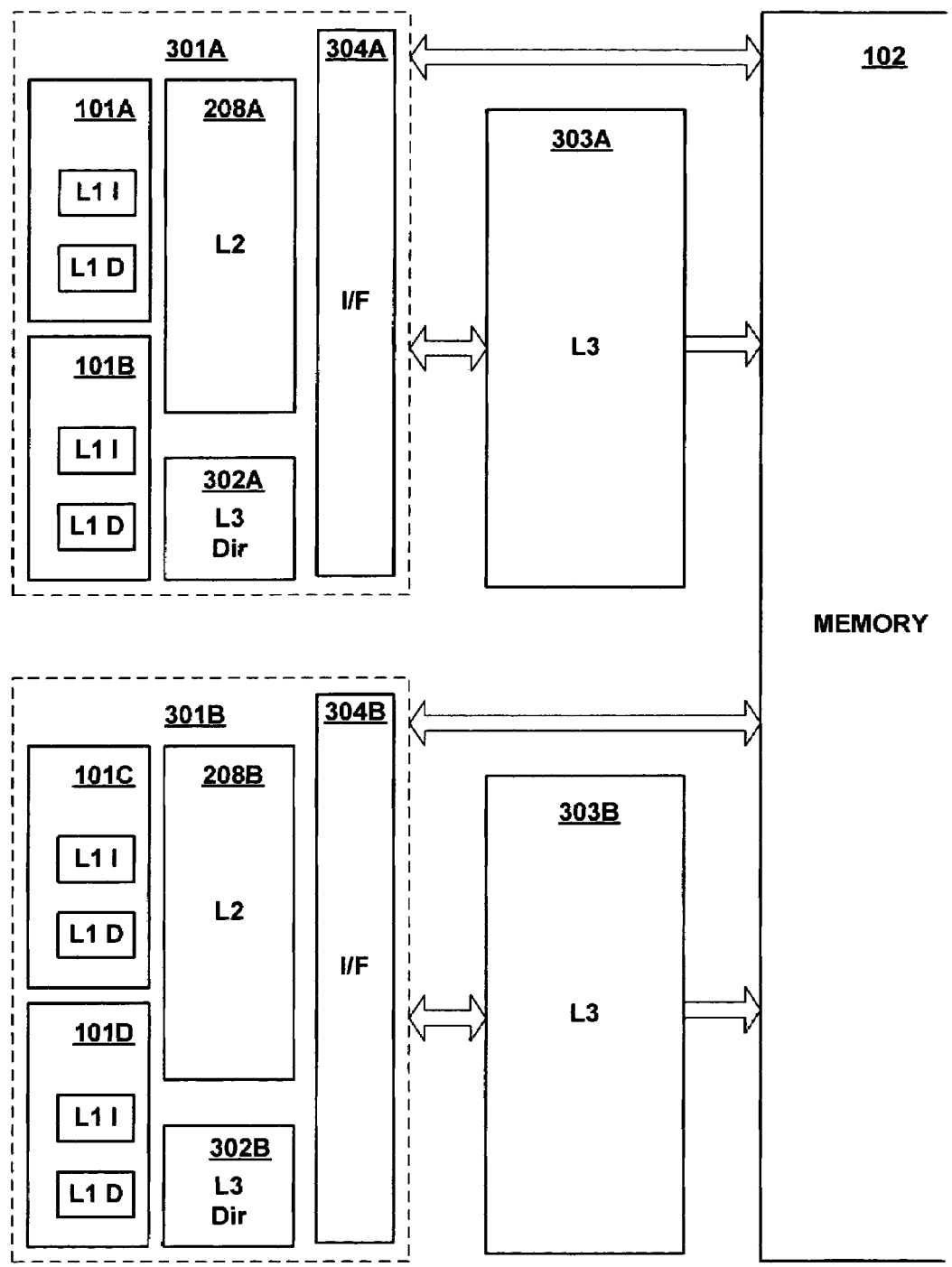
FIG. 3 represents in greater detail the hierarchy of various caches and associated structures for storing and addressing data, according to the preferred embodiment.

FIG. 3 represents in greater detail the hierarchy of various caches and associated structures for storing and addressing data, according to the preferred embodiment. In this embodiment, there are three levels of cache in addition to main memory. Processors 101 are packaged on integrated circuit processor chips 301A, 301B (herein generically referred to as feature 301), each processor chip containing a pair of processors 101 ("processor cores"), a single L2 cache 208A, 208B (herein generically referred to as feature 208) shared by both processors on the chip, a single L3 cache directory 302A, 302B (herein generically referred to as feature 302) shared by both processors on the chip, and an external data interface 304A, 304B (herein generically referred to as feature 304). An L3 cache 303A, 303B (herein generically referred to as feature 303) associated with each L3 cache directory 302 is located off the processor chip, in a location physically closer to the processor than is main memory 102. For example, L3 cache 303 may be packaged on as separate integrated circuit chips mounted on a common printed circuit card with the corresponding processor chip 301. External data interface 304 handles transfer of data across the processor chip boundary and via memory bus 103, which may be between the processor chip and main memory 102, or between the processor chip and L3 cache 303, or to some other structure.

The level 3 caches act as victim caches of the level 2 caches. Data from main memory is loaded first into L2 cache 208, by-passing L3 cache 303. When data is cast out of the L2 cache, it is loaded into the L3, from which it may be re-loaded to L2, or eventually cast out to main memory. From the L2 cache, data is loaded into L1 I-cache 205 or L1 D-cache 206. Depending on the design, it may also be possible to by-pass other cache levels when loading data, e.g., to load data from an L3 cache directly into an L1 cache. Preferably, data is not duplicated in the L2 and L3 caches. I.e., a cache line of data may be in either one of the caches at any given time, but not both.

In the preferred embodiment, there is a one-to-one correspondence between L2 caches and L3 caches, although this is not necessarily required, and there could be multiple L2 caches for each L3 cache. Preferably, an L2/L3 cache pair and is shared by a pair of processors (processor cores) on a single chip 301.

Caches become faster, and store progressively less data, at the higher levels (closer to the processor). In the exemplary embodiment described herein, typical of a large computer system, each L2 cache 208 has a cache line size of 128 bytes and a total storage capacity of 16 Mbytes. Each L3 cache has a cache line size of 128 bytes and a total storage capacity 48 Mbytes. The L2 cache is 8-way associative, and is divided into 16K associativity sets (i.e., each associativity set containing 8 cache lines of data, or 1 Kbyte). The L3 cache is 16-way associative, and is divided into 24K associativity sets (each containing 16 cache lines of data, or 2 Kbytes). The access time to the L2 cache is approximately 20 processor cycles, and the access time to the L3 cache is approximately 100 processor cycles. For comparative purposes, the access time to main memory is on the order of 1000 processor cycles, so substantial performance benefit can be realized if a cache miss at the L2 or higher level can be satisfied by data in the L3 cache, as opposed to accessing main memory. The L1 caches are typically smaller, and have a faster access time. It will be understood, however, that these parameters are merely representative of typical caches in large systems using current technology. These typical parameters could change as technology evolves. Smaller computer systems will generally have correspondingly smaller caches, and may have fewer cache levels. The present invention is not limited to any particular cache size, access times, cache line size, number of cache levels, whether caches at a particular level are shared by multiple processors or dedicated to a single processor, or similar design parameters.

As is known in the art, a cache is accessed by decoding an identification of an associativity set from selective address bits (or in some cases, additional bits, such as a thread identifier bit), and comparing the addresses of the cache lines in the associativity set with the desired data address. For example, where there are 1 K associativity sets in a cache, 10 bits are needed to specify a particular associativity set from among the 1 K. Ideally, these 10 bits are determined so that each associativity set has an equal probability of being accessed.

Conventionally, computer system designers typically use relatively low order real address bits to determine an associativity set, on the assumption that these low order bits correspond to a random allocation of memory accesses, and as a result each associativity set is accessed with equal frequency. However, for a variety of reasons which are not necessarily fully understood, in many environments memory accesses are not randomly distributed among low-order address slices at the level of a typical L2 or L3 cache. This phenomenon appears to be caused at least in part by the design of many databases and other software data structures, although other factors may contribute. These data structures are often aligned on certain addressing boundaries, causing data at certain low level address bits to be accessed more frequently. This phenomenon is generally inconsequential at the level of an L1 cache, which has a smaller number of associativity sets and shorter average lifespan of data in the cache. However, at the level of an L2 or L3 cache, it is possible to detect significant deviation in access frequency among different associativity sets, creating certain "hot" sets among others which are of a lower frequency of access.

In accordance with the preferred embodiment of the present invention, congruence groups of associativity sets are established at the L2 and L3 cache levels, each congruence group containing multiple associativity sets at the L2 level and multiple sets at the L3 level. Specifically, in the preferred embodiment each group contains two associativity sets at the L2 level and three associativity sets at the L3 level. Each of the associativity sets at the L2 level within a single congruence group shares all of the associativity sets at the L3 level in the same congruence group. Therefore, if one of the associativity sets at the L2 level is hot while the other is not, the associativity sets in the same congruence group of the L3 cache can be used predominantly for storing data corresponding to the hot associativity set of the L2 cache, effectively increasing the associativity of the L3 cache from the point of view of the hot associativity set in the L2 cache.

Figure 4:
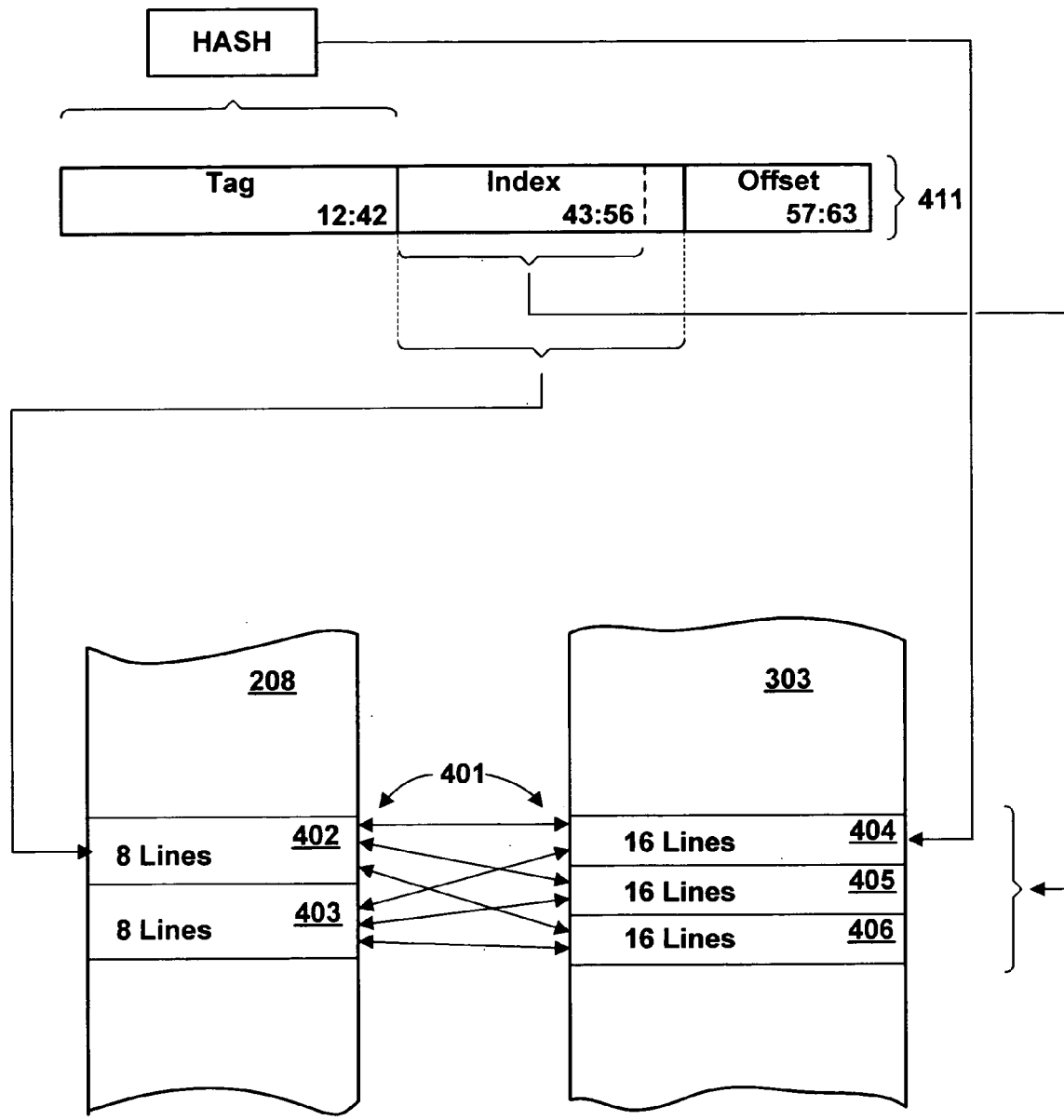
FIG. 4 is a conceptual representation of a congruence group of associativity sets in upper and lower cache levels, according to the preferred embodiment.

FIG. 4 is a conceptual representation of a congruence group of associativity sets in the L2 and L3 caches, according to the preferred embodiment. As shown in FIG. 4, congruence group 401 comprises two associativity sets 402, 403 within L2 cache 208, and three associativity sets 404–406 with L3 cache 303. Each L2 associativity set in congruence group 401 (i.e., sets 402 and 403) corresponds to the three L3 associativity sets in the congruence group. I.e., data addresses which are mapped to an L2 associativity set, such as set 402, are mapped to the three L3 associativity sets 404–406 in a distributed manner. Ideally, these addresses are distributed among the three L3 associativity sets so that the frequencies of data accesses to all three sets are equal.

Since there are 16K associativity sets in the L2 cache, and each congruence group contains two such sets, and there are 24K associativity sets in the L3 cache, each congruence group containing three such sets, it follows that there are a total of 8K congruence groups for the L2/L3 cache pair. A system may have more than one L2/L3 cache pair, in which case each such pair has 8K congruence groups.

As represented in FIG. 4, a real address 411 of data to be accessed is used to select the associativity sets of the L2 and L3 caches. In this representation, real address 411 comprises 52 bits, which are numbered 12 to 63, with bit 63 being the lowest order bit. The seven lowest order address bits, i.e. bits 57–63, constitute an offset portion of the address, the middle range of bits (bits 43–56) are the index portion, and the high order bits (bits 12–42) are sometimes referred to as the tag. The offset bits determine an address of data within a 128-bit cache line. Since there are 16K associativity sets in L2 cache 208, 14 bits are required to specify a single associativity set from among the 16K sets in the L2 cache. In the preferred embodiment, the index bits (real address bits 43–56), being the lowest order real address bits immediately above the offset, are used to select an associativity set in the L2 cache. These real address bits are used without alteration to select the associativity set in the high order cache. In this embodiment, both L2 associativity sets 402, 403 in congruence group 401 share the same bits 43–55 (13 bits), so in effect bits 43–55 determine a congruence group, while bit 56 selects one of the two associativity sets of that congruence group.

An associativity set in the L3 cache is selected using a combination of unaltered real address bits and a hashing function. Specifically, real address index bits 43–55 (13 bits) are used to specify a congruence group, being the same bits as are used to specify the congruence group in the L2 cache. A hashing function is used to select one of the three associativity sets 404–406 within the congruence group.

The hashing function can be any function which is repeatable for any given data address, and which will produce a roughly equal distribution of data accesses among the three associativity sets of the congruence group. In the preferred embodiment, the hashing function is a modulo-3 function of some portion of the real address. It would be possible to derive a modulo-3 function of all the tag bits of the real address (i.e, real address bits 12–42, being the bits above the 7-bit offset and 14-bit index), but since additional bits impose additional delay and/or circuit requirements, and at higher orders provide increasingly diminishing benefit, it is preferable to use only some of these bits. For example, a modulo-3 function might be derived from real address bits 35–42. However, other bit combinations or other hashing functions could be used, which could use other real address bits. It will be observed that it is impossible to obtain a precisely equal allocation of data addresses for three associativity sets from a range which is a power of 2, but if a sufficiently large number of address bits is used in the hashing function, this discrepancy is inconsequential.

The hashing function preferably scatters the allocation of addresses in the lower level cache. I.e., if one considers the address bits above the index bits (real address bits 12–42), then sequential addresses in this range are generally allocated to different associativity sets in the lower level cache. In the case of modulo-3, the addresses in this range are allocated on a round-robin basis. However, a hashing function might perform an allocation which is not strictly round-robin, although in general it should distribute addresses roughly equally, and with a small granularity (preferably the granularity of a single cache line).

Figure 5:
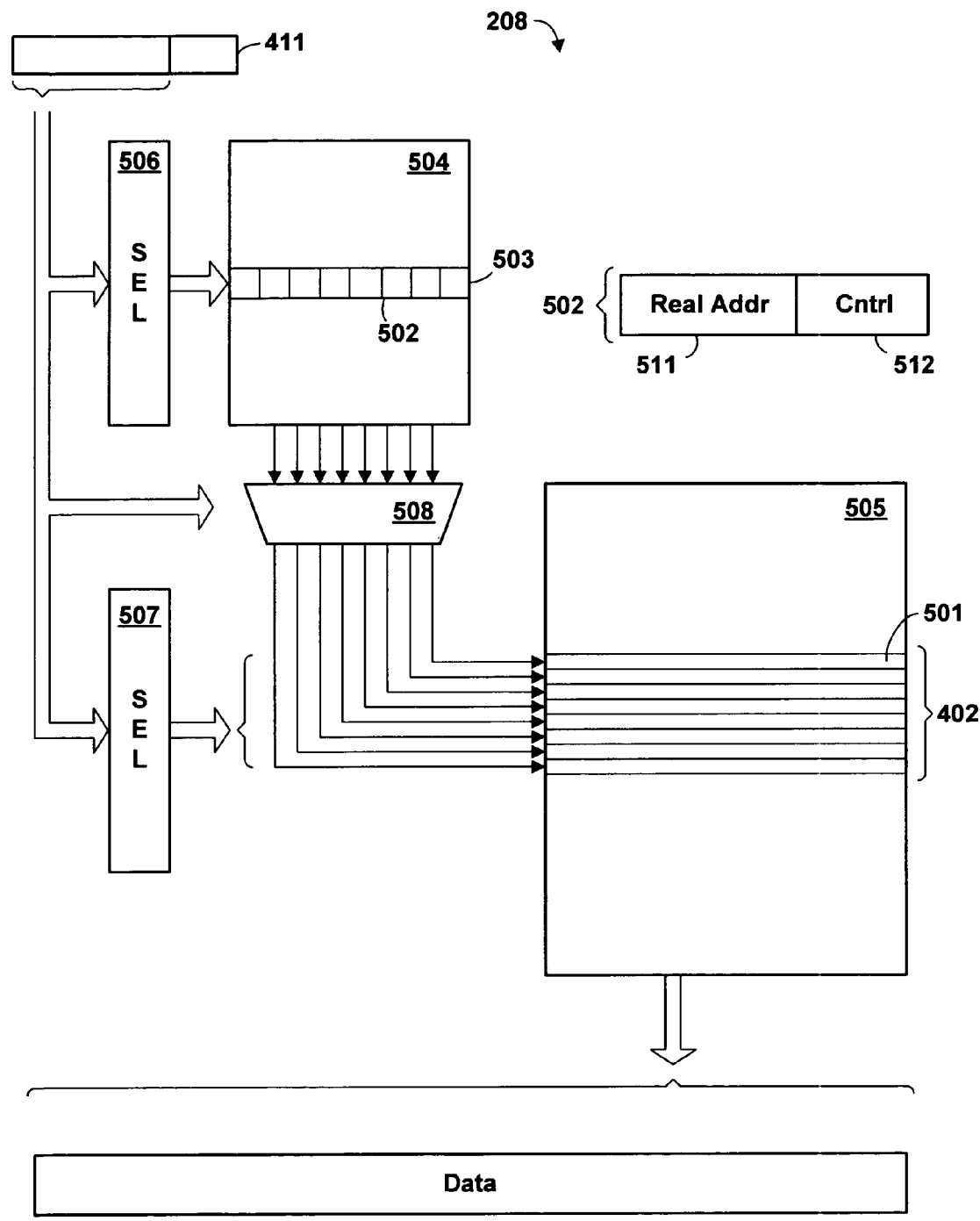
FIG. 5 represents the structure of an L2 cache including associated accessing mechanisms, according to the preferred embodiment.

FIG. 5 is a representation of the structure of an L2 cache 208 including associated accessing mechanisms, according to the preferred embodiment. Referring to FIG. 5, L2 cache comprises a cache data table 505 and an index 504. The data table 505 contains multiple cache lines of data 501 grouped in associativity sets 402. In the preferred embodiment, each cache line 501 contains 128 bytes, and each associativity set 402 contains eight cache lines. Index 504 contains rows 503 of index entries 502, each row 503 corresponding to an associativity set 402 and containing eight index entries. Each index entry 502 contains at least a portion of a real address 511 of a corresponding cache line 501, and certain control bits 512. Control bits may include, but are not necessarily limited to: a dirty bit; one ore more bits for selecting a cache line to be cast out, such as least-recently-used (LRU) bits, one or more bits used as semaphores, locks or similar mechanisms for maintaining cache coherency; etc., as are known in the art.

A cache line is referenced by selecting a row 503 of index 504 corresponding to some portion of the real address 411 of the desired data, using selector logic 506. In the preferred embodiment, the 14 bits of real address at bit positions 43 to 56 are input to selector logic 506. The real address 511 in each respective index entry 502 of the selected row 503 is then compared with the real address 411 of the referenced data by comparator logic 508. In fact, it is only necessary to compare the high-order bit portion of the real address (i.e., bits 12 to 42), since bits 43 to 56 inherently compare by virtue of the row selection, and offset bits 57–63 are not necessary to determine a cache line. If there is a match, comparator logic 508 outputs a selection signal corresponding to the matching one of the eight index entries. Selector logic 507 selects an associativity set 402 of cache lines 501 using the same real address bits used by selector 506, and the output of comparator 508 selects a single one of the eight cache lines 501 within the selected associativity set.

Although selectors 506 and 507 are shown in FIG. 5 as separate entities, it will be observed that they perform identical function. Depending on the chip design, these may in fact be a single selector, having outputs which simultaneously select both the index row 503 in the index 504 and the associativity set 402 in the cache data table 505.

Figure 6:
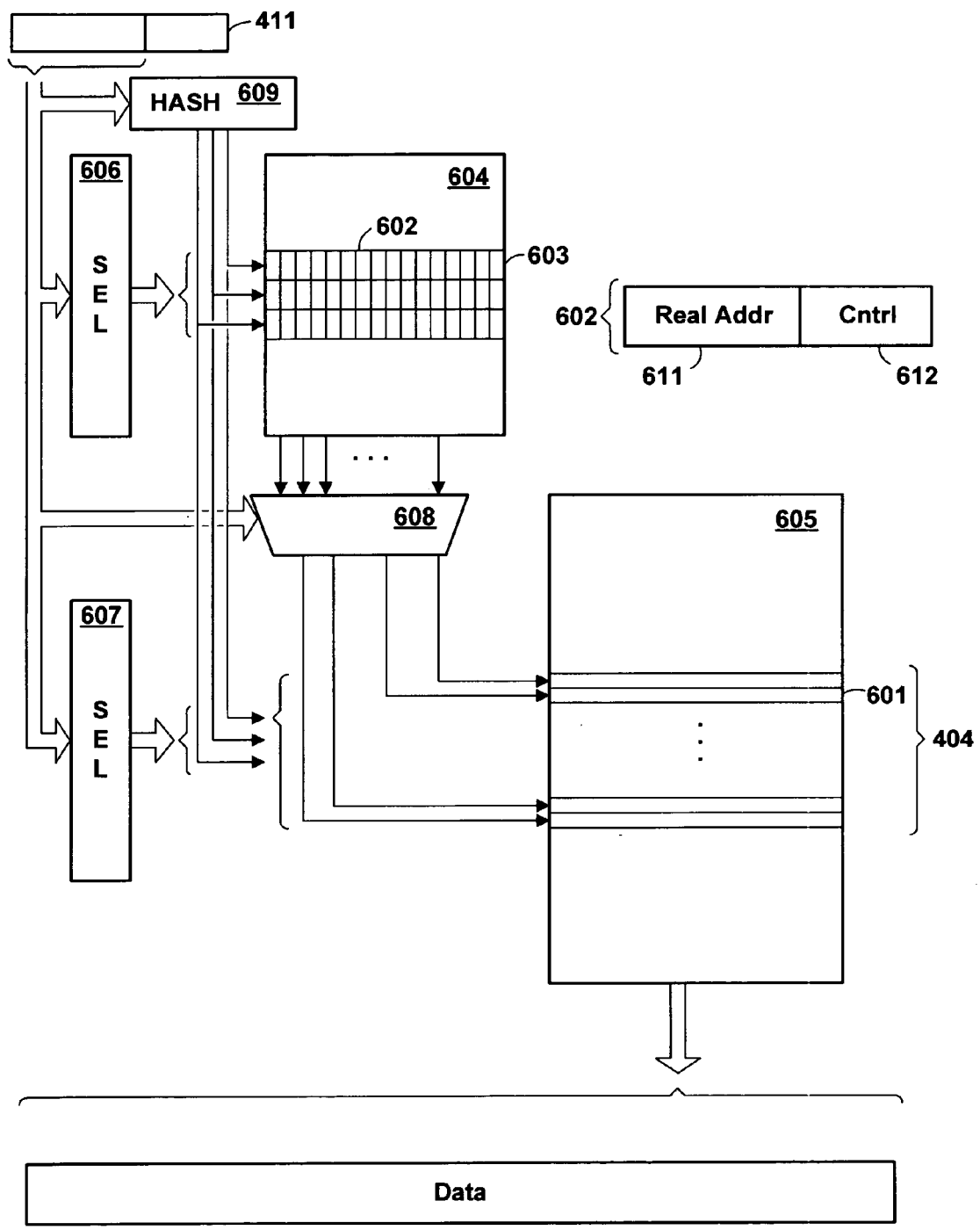
FIG. 6 represents the structure of an L3 cache including associated accessing mechanisms, according to the preferred embodiment.

The L3 cache is similar, but a hash function is used in addition to unaltered real address bits to select an associativity set of cache lines. FIG. 6 is a representation of the structure of an L3 cache 303, L3 cache directory 302, and associated accessing mechanisms, according to the preferred embodiment.

Referring to FIG. 6, L3 cache comprises a cache data table 605 and an index 604. The data table 605 contains multiple cache lines of data 601 grouped in associativity sets 404. In the preferred embodiment, each cache line 601 contains 128 bytes, and each associativity set 404 contains sixteen cache lines. Index 604 contains rows of index entries 602, each row corresponding to an associativity set 404 and containing sixteen index entries. Each index entry contains at least a portion of a real address 611 of a corresponding cache line 601, and certain control bits 612. Control bits may include, but are not necessarily limited to: a dirty bit; one ore more bits for selecting a cache line to be cast out, such as least-recently-used (LRU) bits, one or more bits used as semaphores, locks or similar mechanisms for maintaining cache coherency; etc., as are known in the art.

A cache line is referenced by selecting a group of three rows 603 of index 604 corresponding to some portion of the real address 411 of the desired data, using selector logic 606. This group of three rows corresponds to a congruence group 401. In the preferred embodiment, the 13 bits of real address at bit positions 43 to 55 are input to selector logic 606 to select the congruence group. From the group of three rows selected by selector 606, one of the rows 603 is selected using the output of hash function generator 609. As explained previously, the hash function is preferably a modulo-3 function of some portion of the real address, although other hash functions could alternatively be used. The real address portion 611 in each respective index entry 602 of the selected row 603 is then compared with the corresponding portion of real address 411 of the referenced data by comparator logic 608. If there is a match, comparator logic 608 outputs a selection signal corresponding to the matching one of the sixteen index entries. Selector logic 607 selects a group of three associativity sets of cache lines 601 (i.e., a congruence group) using the same real address bits used by selector 606. A single associativity set 404 within the congruence group is selected from among the three using the output of hash function generator 609. The output of comparator 608 selects a single one of the sixteen cache lines 601 within the selected associativity set 404.

The entire structure shown in FIG. 6 is sometimes referred to as the L3 cache, or alternatively cache data table 605 and certain associated structures are referred to as the L3 cache. In the preferred embodiment, the L3 cache directory 302, which generally comprises index table 604, selector logic 606, hash function generator 609, and comparator 608, is physically implemented in the processor chip 301, while cache data table 605 and selector logic 607 are physically implemented off the chip. Hash function generator 609 may be duplicated in the off-chip portion of the L3 cache, represented generally in FIG. 3 as feature 303.

In operation, a memory reference is satisfied from L1 cache if possible. In the event of an L1 cache miss, the L2 and L3 cache indexes (directories) are simultaneously accessed using selective real address bits to determine whether the required data is in either cache. If the data is in L2, it is generally loaded into the L1 cache from L2, but remains unaltered in the L2. (Because the L2 cache is shared, there could be circumstances in which the data is in an L1 cache of another processor and temporarily unavailable.)

If the data is in the L3 (i.e., it is not in the L2), it is concurrently loaded into the L2 and the L1 from the L3. In this case, a cache line from the L2 is selected for cast out to the L3, using any of various conventional selection techniques, such as least recently used. Since the L3 is loading one of its lines to the L2, the line being loaded to L2 will make room for the cast-out line from the L2, and it is not necessary to cast out a line from the L3. In order to make room in the L1 cache, one of the existing lines will be selected for cast-out; however, since the L1 cache entries are duplicated in the L2, this cast-out line is necessarily already in the L2, so it is not necessary to make room for it.

If the data is in neither the L2 nor the L3, then it is fetched from main memory into the L2 and L1. In this case, a cache line from L2 is selected for cast out to the L3, using any conventional technique. In order to make room in L3, another cache line in the L3 must be selected for cast out to main memory, again using any conventional technique.

In the preferred embodiment as described above, the L2 cache is loaded only on demand (i.e., in the event of a cache miss when a data reference is generated), the L3 cache is a victim cache of the L2, and data is not duplicated in the L2 and L3 caches. However, it would be possible to operate one or both of these caches using any of various different selection strategies, now known or hereafter developed. For example, some pre-fetch technique might be employed for prospectively loading data into the L2 cache or the L3 cache in advance of an actual data reference and cache miss.

In the preferred embodiment, a congruence group contains two associativity sets at the higher level and three associativity sets at the lower level of cache. However, it will be appreciated that these numbers represent only one embodiment, and that a congruence group may have a different number of associativity sets. There will be some design trade-off between the number of associativity sets in the congruence group and the complexity of access. In general, a larger number of associativity sets in each congruence group will generally improve the randomization, but will also increases the complexity of implementation.

Preferably, the number of associativity sets in a congruence group and the hashing function are chosen so that addresses on the same power-of-two boundaries get distributed among different associativity sets in the lower level cache, in order to avoid unforeseen hot activity in one of the lower level associativity sets. To this end, there is some advantage in using pairs of numbers having no common factor, such as two and three, as in the preferred embodiment. For example, where the lower level cache contains three associativity sets in each congruence group, a modulo-3 hashing function scatters the addresses on any power-of-two boundary. However, it may also be possible to achieve similar effect using only a suitable hash function. For example, there could be two associativity sets in the upper level cache and four associativity sets in the lower level cache, where an lower level cache associativity set within the congruence group is selected using a hash function which scatters the alignment of addresses.

Although it is preferable to scatter alignment of addresses on power-of-two boundaries in the lower level cache as explained above, it is not strictly required, and certain benefits of the present invention may be realizable in other ways, or without scattering address alignment. For example, it would alternatively be possible to scatter alignment of addresses in the upper level cache (using, e.g., three upper level associativity sets in each congruence group).

In the preferred embodiment, a modulo-3 hashing function using higher order bits of real address is used to distribute addresses in an associativity set at the higher level among three associativity sets at the lower level. Different hashing or other functions might be used to distribute addresses in an associativity set at the higher level among the multiple sets at the lower level. It is preferred that higher level addresses be distributed with a small granularity or granularity of one, meaning that, for each sequential real address portion above the real address index used to determine an associativity set in the higher order cache, a different associativity set is generally selected at the lower level cache. However, it would alternatively be possible to allocate contiguous blocks of real address portions above the real address index.

In the preferred embodiment, a computer system uses a three-level addressing scheme, in which effective addresses are translated to virtual addresses, which in turn are translated to real addresses, when accessing cache or memory. However, the present invention is not limited to any particular addressing scheme, and would be applicable to systems having fewer than three levels of addressing, or more than three levels of addressing.

Although a specific embodiment of the invention has been disclosed along with certain alternatives, it will be recognized by those skilled in the art that additional variations in form and detail may be made within the scope of the following claims:

What is claimed is:

1. A digital data processing device, comprising:
   at least one processor;
   a memory;
   a first cache for temporarily holding portions of said memory, said first cache containing a plurality of addressable associativity sets, each associativity set containing one or more respective cache lines and corresponding to a respective first cache subset of a plurality of discrete first cache subsets of addresses for accessing said first cache; and
   a second cache for temporarily holding portions of said memory, said second cache containing a plurality of addressable associativity sets, each associativity set containing one or more respective cache lines and corresponding to a respective second cache subset of a plurality of discrete second cache subsets of addresses for accessing said second cache;
   wherein each said associativity set of said first cache and each said associativity set of said second cache is contained in a respective congruence group of a plurality of congruence groups, each congruence group containing a respective plurality of associativity sets of said first cache and a respective plurality of associativity sets of said second cache;
   wherein addresses of the first cache subset corresponding to each respective associativity set of said first cache are allocated among each of the plurality of second cache subsets corresponding to respective associativity sets in said second cache within the same congruence group as the respective associativity set of said first cache.

2. The digital data processing device of claim 1, wherein addresses of the first cache subset corresponding to each respective associativity set of said first cache are allocated among each of the plurality of second cache subsets corresponding to respective associativity sets in the second cache within the same congruence group using a hashing function of at least some address bits other than address bits used to determine the respective associativity set.

3. The digital data processing device of claim 2, wherein said hashing function is a modulo-N function, where N is the number of associativity sets of said second cache in said congruence group.

4. The digital data processing device of claim 1, wherein each said congruence group contains M associativity sets of said first cache and N associativity sets of said second cache, wherein the greatest common factor of M and N is one.

5. The digital data processing device of claim 1, wherein data is not duplicated in said first and second caches.

6. The digital data processing device of claim 1, wherein said first cache is at a higher level than said second cache.

7. The digital data processing device of claim 6, wherein said second cache is a victim cache of said first cache.

8. The digital data processing device of claim 6, wherein said digital data processing device comprises a third cache, said third cache being at a level higher than said first cache and said second cache.

9. The digital data processing device of claim 1, wherein said first and second caches are addressable using real memory addresses.

10. The digital data processing device of claim 1, wherein each said associativity set in said first cache contains a respective plurality of cache lines, and each said associativity set in said second cache contains a respective plurality of cache lines.

11. An integrated circuit chip for digital data processing, comprising:
- at least one processor core;
- first cache accessing logic for accessing a first cache, said first cache temporarily holding portions of a memory, said first cache accessing logic determining an associativity set of said first cache which corresponds to an input address generated by said processor core from among a plurality of associativity sets of said first cache, each associativity set containing one or more respective cache lines, wherein a respective first cache subset of input addresses of a plurality of discrete first cache subsets of input addresses corresponds to each associativity set of said plurality of associativity sets of said first cache; and
- second cache accessing logic for accessing a second cache, said second cache temporarily holding portions of said memory, said second cache accessing logic determining an associativity set of said second cache which corresponds to said input address generated by said processor core from among a plurality of associativity sets of said second cache, each associativity set containing one or more respective cache lines, wherein a respective second cache subset of input addresses of a plurality of discrete second cache subsets of input addresses corresponds to each associativity set of said plurality of associativity sets of said second cache;
- wherein each said associativity set of said first cache and each said associativity set of said second cache is contained in a respective congruence group of a plurality of congruence groups, each congruence group containing a respective plurality of associativity sets of said first cache and a respective plurality of associativity sets of said second cache;
- wherein input addresses of the first cache subset corresponding to each respective associativity set of said first cache are allocated among each of the plurality of second cache subsets corresponding to respective associativity sets in said second cache within the same congruence group as the respective associativity set of said first cache.

12. The integrated circuit chip of claim 11, wherein input addresses of the first cache subset corresponding to each respective associativity set of said first cache are allocated among each of the plurality of second cache subsets corresponding to respective associativity sets in said second cache within the same congruence group using a hashing function of at least some address bits other than address bits used to determine the respective associativity set.

13. The integrated circuit chip of claim 12, wherein said hashing function is a modulo-N function, where N is the number of associativity sets of said second cache in said congruence group.

14. The integrated circuit chip of claim 11, wherein each said congruence group contains M associativity sets of said first cache and N associativity sets of said second cache, wherein the greatest common factor of M and N is one.

15. The integrated circuit chip of claim 11, wherein data is not duplicated in said first and second caches.

16. The integrated circuit chip of claim 11, wherein said first cache is at a higher level than said second cache.

17. The integrated circuit chip of claim 16, wherein said second cache is a victim cache of said first cache.

18. The integrated circuit chip of claim 11, wherein said first and second caches are addressable using real memory addresses.

19. The integrated circuit chip of claim 11, wherein each said associativity set in said first cache contains a respective plurality of cache lines, and each said associativity set in said second cache contains a respective plurality of cache lines.

20. The integrated circuit chip of claim 11, wherein said chip includes at least one of said first cache and said second cache.

21. The integrated circuit chip of claim 11, wherein said chip includes a plurality of processor cores, said plurality of processor cores sharing said first and second caches.

22. A method of operating cache memory in a digital data processing device, comprising the steps of:
- responsive to an input address, determining an associativity set of a first cache which corresponds to said input address from among a plurality of associativity sets of said first cache, each associativity set containing one or more respective cache lines, wherein a respective first cache subset of input addresses of a plurality of discrete first cache subsets of input addresses corresponds to each associativity set of said plurality of associativity sets of said first cache;
- responsive to said step of determining an associativity set of a first cache, determining whether the associativity set determined by said step of determining an associativity set of a first cache contains data corresponding to said input address;
- responsive to said input address, determining an associativity set of a second cache which corresponds to said input address from among a plurality of associativity sets of said second cache, each associativity set containing one or more respective cache lines, wherein a respective second cache subset of input addresses of a plurality of discrete second cache subsets of input addresses corresponds to each associativity set of said plurality of associativity sets of said second cache;
- responsive to said step of determining an associativity set of a second cache, determining whether the associativity set determined by said step of determining an associativity set of a second cache contains data corresponding to said input address;
- wherein each said associativity set of said first cache and each said associativity set of said second cache is contained in a respective congruence group of a plurality of congruence groups, each congruence group containing a respective plurality of associativity sets of said first cache and a respective plurality of associativity sets of said second cache;
- wherein, for each subset pair (S1, S2) consisting of a subset S1 of first cache input addresses corresponding to an associativity set of said first cache within a congruence group C and a subset S2 of second cache input addresses corresponding to an associativity set of said second cache within the same congruence group C, the intersection of the two subsets S1 and S2 of the subset pair is a non-empty set of input addresses.

23. The method of claim 22, wherein addresses corresponding to each respective associativity set of said first cache are allocated among the plurality of associativity sets in the second cache within the same congruence group using a hashing function of at least some address bits other than address bits used to determine the respective associativity set.

24. The method of claim 23, wherein said hashing function is a modulo-N function, where N is the number of associativity sets of said second cache in said congruence group.

25. The method of claim 22, wherein each said congruence group contains M associativity sets of said first cache and N associativity sets of said second cache, wherein the greatest common factor of M and N is one.

26. The method of claim 22, wherein data is not duplicated in said first and second caches.

27. The method of claim 22, wherein said first cache is at a higher level than said second cache.

28. The method of claim 27, wherein said second cache is a victim cache of said first cache.

29. The method of claim 22, wherein said first and second caches are addressable using real memory addresses.

30. The method of claim 22, wherein each said associativity set in said first cache contains a respective plurality of cache lines, and each said associativity set in said second cache contains a respective plurality of cache lines.

31. A digital data processing device, comprising:
   at least one processor;
   a memory;
   a first cache for temporarily holding portions of said memory, said first cache containing a plurality of addressable associativity sets, each associativity set containing one or more respective cache lines; and
   a second cache for temporarily holding portions of said memory, said second cache containing a plurality of addressable associativity sets, each associativity set containing one or more respective cache lines;
   wherein each said associativity set of said first cache corresponds to a respective first cache subset containing a respective plurality of addresses of data storable in the associativity set of said first cache, and each said associativity set of said second cache corresponds to a respective second cache subset containing a respective plurality of addresses of data storable in the associativity set of said second cache;
   wherein addresses contained in the first cache subset corresponding to each respective associativity set of said first cache are allocated among each of a respective plurality of second cache subsets corresponding to respective associativity sets in said second cache;
   wherein addresses contained in the second cache subset corresponding to each respective associativity set of said second cache are allocated among each of a respective plurality of first cache subsets corresponding to respective associativity sets in said first cache.

32. The digital data processing device of claim 31, wherein addresses contained in the first cache subset corresponding to each respective associativity set of said first cache are allocated among each of the plurality of second cache subsets using a hashing function of at least some address bits other than address bits used to determine the respective associativity set of said first cache.

33. The digital data processing device of claim 32, wherein said hashing function is a modulo-N function, where N is the number of associativity sets of said second cache to which addresses in an associativity set of said first cache are allocated.

34. The digital data processing device of claim 31, wherein data is not duplicated in said first and second caches.

35. The digital data processing device of claim 31, wherein said first cache is at a higher level than said second cache.

36. The digital data processing device of claim 35, wherein said second cache is a victim cache of said first cache.

* * * * *